US 6,593,531 B2

(12) United States Patent
Hülsmann et al.

(10) Patent No.: US 6,593,531 B2
(45) Date of Patent: Jul. 15, 2003

(54) ADD-ON HOUSING

(75) Inventors: Ingrid Hülsmann, Korntal-Münchingen (DE); Frank Andrä, Deizisau (DE)

(73) Assignee: Contact GmbH, Stuttgart (DE)

( * ) Notice: Subject to any disclaimer, the term of this patent is extended or adjusted under 35 U.S.C. 154(b) by 0 days.

(21) Appl. No.: 10/129,653

(22) PCT Filed: Aug. 9, 2001

(86) PCT No.: PCT/EP01/09227

§ 371 (c)(1),
(2), (4) Date: Aug. 26, 2002

(87) PCT Pub. No.: WO02/21655

PCT Pub. Date: Mar. 14, 2002

(65) Prior Publication Data

US 2003/0037951 A1 Feb. 27, 2003

(30) Foreign Application Priority Data

Sep. 11, 2000 (DE) .......................... 100 44 791

(51) Int. Cl.$^7$ ................................ H02G 3/14
(52) U.S. Cl. .................... 174/66; 174/67; 220/241; 220/242
(58) Field of Search .............. 174/50, 66, 67, 174/58, 53; 220/241, 242, 3.8, 3.3, 3.5, 4.02

(56) References Cited

U.S. PATENT DOCUMENTS

| 2,967,722 | A | | 1/1961 | Lifka ......................... 285/127 |
|---|---|---|---|---|
| 3,624,794 | A | | 11/1971 | Futty et al. .................. 222/154 |
| 3,840,692 | A | * | 10/1974 | Wells ........................... 174/66 |
| 4,479,317 | A | * | 10/1984 | Hanna ...................... 174/66 X |
| 4,780,573 | A | * | 10/1988 | Own ............................. 174/66 |
| 5,901,986 | A | | 5/1999 | Kirma ..................... 285/126.1 |
| 6,184,468 | B1 | * | 2/2001 | Speziale ................. 220/241 X |
| 6,218,616 | B1 | * | 4/2001 | Bates et al. .................... 174/66 |
| 6,252,167 | B1 | * | 6/2001 | Rose ...................... 220/241 X |
| 6,459,250 | B1 | * | 10/2002 | Davis ..................... 220/241 X |

FOREIGN PATENT DOCUMENTS

| DE | 3403774 A1 | 8/1985 | ........... H02G/3/18 |
|---|---|---|---|
| WO | WO 02/21655 A1 | 3/2002 | ........... H02G/3/06 |

* cited by examiner

*Primary Examiner*—Dean A. Reichard
*Assistant Examiner*—Dhiru R Patel
(74) *Attorney, Agent, or Firm*—Wood, Herron & Evans, LLP

(57) ABSTRACT

The present invention relates to a mounting housing for example or circular connectors. For a convenient pre-assembly of the mounting housing it includes an access opening which can be closed by a cover. The cover is hooked in a housing body of the mounting housing on one side and is secured at the housing body via a retaining nut, with the cover in conjunction with a seal arranged in the area of the access opening sealing same. In addition, a vibration protection is provided in that the cover includes a contoured area which in the screwed on condition is urged by the retaining nut against a corresponding area of the housing body. The mounting housing also includes a mounting flange which is formed at the housing body in such a manner that an installation and removal of the mounting housing at corresponding mounting surfaces is possible after the pre-assembly of the mounting housing.

18 Claims, 4 Drawing Sheets

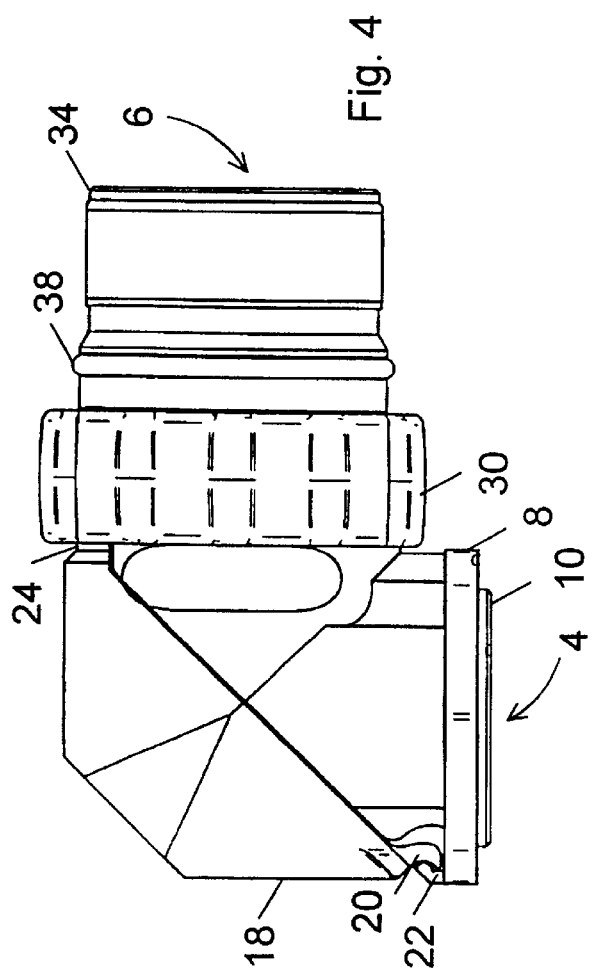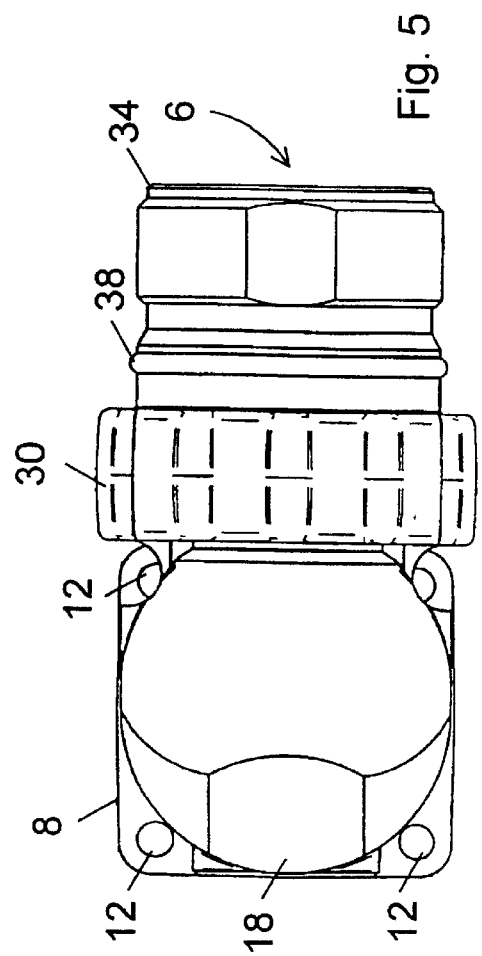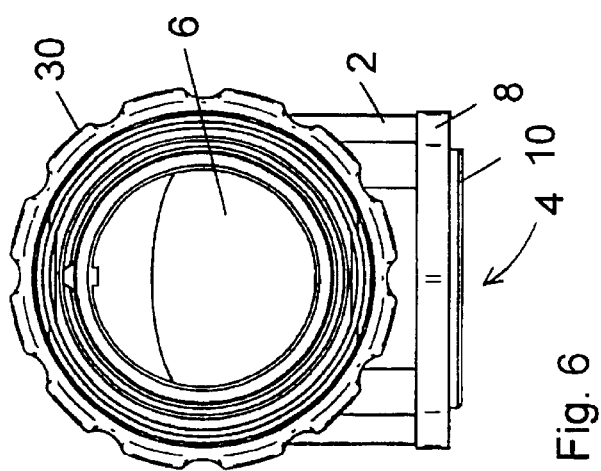

ADD-ON HOUSING

FIELD OF THE INVENTION

The present invention relates to a mounting housing for electrical and/or optical conductors, fluid lines, and mechanical components, such as e.g. articulated shafts or Bowden cables. The invention relates in particular to an angled mounting housing which, in the pre-assembled condition, can be attached at a corresponding mounting surface, with a cover which can easily be locked with the body of the mounting housing being used for the access to the feed-through of same.

BACKGROUND OF THE INVENTION

In order to attach for example connectors for electrical and/or optical conductors at a casing of a switchgear cabinet, so-called mounting housings are used. The mounting housings are attached at an external surface of the switchgear cabinet casing and comprise a feed-through which is communicating with the interior of the switchgear cabinet. The feed-through serves to guide electrical and/or optical conductors from the switchgear cabinet to a connector which is installed at the mounting housing. Mounting housings are required in particular if connectors for switchgear cabinets are to be provided which are not to be arranged perpendicular to a respective surface of the switchgear cabinet. In these cases, angled e.g. angled by 90°, and curved mounting housings are used.

For pre-assembly of the mounting housings, these can comprise access opening to the feed-throughs, which can be closed by means of covers. Usually, such covers are screwed to the body of a mounting housing in order to tightly seal the access opening, partly under using suitable sealing elements. It is also known to secure such covers at the body of the mounting housing by means of suitable locking or snap-action connections.

From DE 34 03 774 A1 an angular line lead-in with a closing part which is pivotably linked in the area of a face at the outer edge is known. In order to maintain the closing part in its locked position, a snap is provided at its other face. This snap is constituted by a projection formed at an angle leg of the line lead-in and a groove formed in the closing part, with which the projection engages upon closing the closing part.

This approach impedes the removal of the cover if, for example, an access is required to the feed-through of the, mounting housing for maintenance work. In this case, the removal of a cover is generally not possible without special tools. When using screwed covers additional tools are already required for closing the access opening.

In addition, it is generally not possible to attach a mounting housing e.g. to a switchgear cabinet before the mounting housing has been pre-assembled with corresponding electrical and/or optical conductors and/or connectors.

Similar problems result if mounting housings are used for (flexible) fluid lines, mechanical components such as e.g. articulated shafts or Bowden cables and the like, for guiding same (in an angled fashion) out of the housing of a corresponding device. From DE 297 07 529 U1 a cable feed-through is known which can be attached at a cable and at a housing which accommodates the wires of the cable in its inner space. For securing the cable feed-through at the housing, one end of the cable feed-through comprises a flange with holes formed therein.

OBJECT OF THE INVENTION

It is the object of the present invention to provide a mounting housing for the mentioned components to be guided by means of a mounting housing, which can readily be pre-assembled, permits a convenient access to the inner space of the mounting housing at any time, and which enables a tight sealing of the access opening to the inner space of the mounting housing, or its clearing, respectively, without special tools. Moreover, the invention is to provide a mounting housing which in the pre-assembled condition can be attached at a corresponding mounting surface.

BRIEF DESCRIPTION OF THE INVENTION

For this purpose, the invention provides a mounting housing for electrical and/or optical conductors, fluid lines, mechanical components such as e.g. articulated shafts or Bowden cables, and the like. The inventive mounting housing comprises a housing body, a feed-through extending through the housing body, an access opening to the feed-through through the housing body, a cover movably connected with the housing body for closing and clearing the access opening, and a retaining means for securing the cover in its closed condition at the housing by means of a clamping connection.

The cover comprises in particular an extended area which in the closed condition of the cover is secured (clamped) between the retaining means and the housing body.

In order to improve the secureness of the cover the housing body comprises a contact area for the extended area of the cover, with these areas being preferably formed in a positive manner. This positive fit between the extended area and the contact area improves the clamping effect of the retaining means in the secured condition of the cover.

In addition, the extended area of the cover may comprise a, contoured area which, for example, may be provided with recesses (longitudinal grooves, transverse grooves) formed in the cover. If the extended area is elastically deformable at least in the contoured area, the extended area additionally serves as a vibration protection for the cover.

In order to tightly seal the access opening in the closed condition of the cover a sealing element (e.g. an O-ring) is, arranged in the area of the access opening. If the sealing element is elastic so that it is elastically deformable with the cover in the closed and secured condition due to an active connection with same, the forces which are thereby generated and act on the cover contribute to the secureness of the cover.

As the retaining means a retaining nut or a sleeve which can be slid onto the housing body can be used. In the case of using a retaining nut, the housing body comprises a thread for fastening same. In this case, it is provided that the thread for the retaining nut is spaced in the longitudinal direction of the feed-through from the contact area or that in encompasses the contact area.

In the case of a slide-on retaining sleeve, this is to be secured on the housing body so that it will not be moved e.g. due to the elastic forces generated by the sealing element in the area of the access opening and/or the extended area of the cover. For this purpose, locking elements and/or clamping elements may be formed at the housing body. Examples for the locking elements are structures or components which are suitable for the manufacture of engaging or snap-action connections or components for bayonet joints. As clamping elements, for example wedge-shaped structures formed at the housing body can be used.

In order to secure the retaining sleeve in a removable manner at the housing body, the locking elements and/or the clamping elements can be correspondingly movable and/or elastically deformable. Here, it is also possible to use an elastically deformable retaining sleeve which for releasing its secure position at the housing body is elastically deformed.

In order to be able to attach the mounting housing at a corresponding mounting surface also in the pre-assembled condition, the housing body comprises a mounting flange at a first end, with holes formed through it. In particular, the holes of the mounting flange are arranged in such a manner that they can be accessed also in the closed condition of the cover in order to insert e.g. fastening screws.

Alternatively or additionally, the housing body may comprise locking or snap-action elements at its first end, which in the closed condition of the cover, can be actuated for installation and removal of the mounting housing.

In an embodiment, the cover is movably hooked in the housing body by means of structures (e.g. projections forming a hinge) formed at the cover and the housing body, preferably at its first end. This construction permits a simple manufacture of the mounting housing, with the additional possibility, for example for pre-assembling the mounting housing, to remove the cover from the housing body (unhook it). This movable connection can also be made by means of shafts and/or pins which are in active connection with the cover and the housing body whereby, on the one hand, a removal of cover becomes more difficult but, on the other hand, the stability of its connection with the housing body is improved.

In addition, the housing body may comprise fastening elements at a second end opposite the first end for fastening devices to be arranged at the mounting housing. Examples for such devices are connectors for electrical and/or optical conductors, connections for fluid lines and the like. Depending on the devices to be arranged, these fastening elements of the housing body may be threads, snap-action and/or locking elements, or structures for bayonet joints formed thereon.

For securing the retaining means the mounting housing comprises components which prevent a removal of the retaining means. Preferably, these securing components for the retaining means comprise a groove formed in the housing body and an O-ring which can be installed at the housing body in an active connection with the groove. The O-ring is dimensioned in such a manner that the retaining means cannot be removed from the housing body. In addition, such an O-ring also serves as a sealing element and vibration protection for any of the previously mentioned devices which can be arranged at the housing body.

Preferably, the housing body is a curved or angled (e.g. by 90°) body, with the possibility of also using an oblong housing body, if an access is to be made to its feed-through in the area of the connection with the respective mounting surface.

It is provided that the feed-through through the housing body has an essentially round or rectangular cross-section, with the housing body, in particular in the case of using a retaining nut, having a round cross-section at least in the area of the thread in the longitudinal direction of the feed-through.

BRIEF DESCRIPTION OF THE FIGURES

In the description of preferred embodiments reference is made to the accompanying figures in which:

FIG. 4 shows a side view of the mounting housing of FIG. 1 in the assembled condition;

FIG. 5 shows a plan view of the mounting housing of FIG. 4;

FIG. 6 shows another side view of the mounting housing of FIG. 4; and

DESCRIPTION OF PREFERRED EMBODIMENTS

Figure 1:
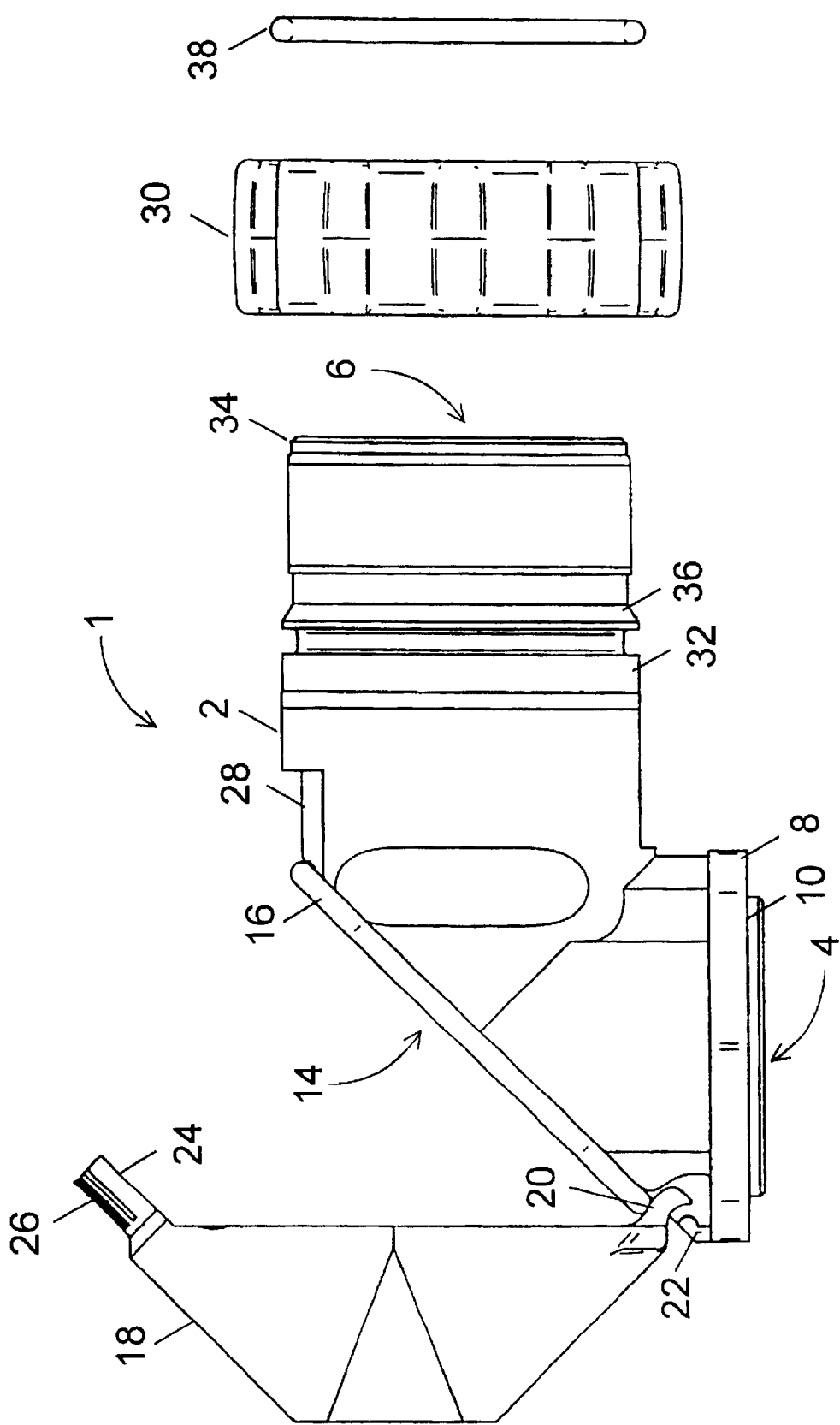
FIG. 1 shows a schematic side view of a preferred embodiment of an inventive mounting housing.

The mounting housing 1 shown in FIGS. 1 to 6 comprises a housing body 2 angled by 90°, through which a conductor feed-through (not identified) extends between openings 4 and 6. The conductor feed-through has an essentially round cross-section and serves to accommodate conductors for electrical and/or optical signals. As mentioned, the mounting housing 1 can also be used for the accommodation of other lines and components, such as e.g. fluid lines, Bowden cables, and articulated shafts.

At its end in the area of the opening 4 the housing body 2 comprises a mounting flange 8 and a shoulder 10 formed thereon. As can be seen in FIG. 5, the mounting flange 8 has an essentially rectangular cross-section and comprises one hole 12 each in its corner areas. The mounting flange 8 and its holes 12 serve to secure the mounting housing 1 on a surface, e.g. of an electrical switchgear cabinet. In the area of the opening 4 the shoulder 10 has a cross-section which essentially corresponds to the cross-section of the cable feed-through (not identified) and, upon an installation of the mounting housing 1, is inserted into an opening in the surface at which the mounting housing 1 is to be attached. In order to seal the transition between the mounting housing 1 and the corresponding mounting surface the bottom surface of the mounting flange 8 (FIG. 1) and/or the outer circumferential surface of the shoulder 10 may comprise a seal. The seal may be provided in the form of an O-ring, a coating, a flat seal and the like, and depending on the selected type of seal, can also serve as vibration protection.

For pre-assembling the mounting housing 1, i.e. for arranging conductors in its conductor through-feed, the housing body 2 comprises an access opening 14 in its angled area, which due to the cross-section of the cable feed-through has an essentially round cross-section. Depending on the cross-section selected for the cable feed-through, the access opening 14 may have other cross-sectional shapes. In the area of the circumference of the access opening 14 an O-ring 16 is arranged as a seal.

For clearing and closing the access opening 14, a cover 18 is used which is hooked in the area of the face shown as upper face in FIG. 1 of the mounting flange 8. For this purpose, the projections 20 and 22 formed at the cover 18 and the mounting flange 8 are provided. In lieu of the projections 20 and 22 which are formed to be oblong as can be seen from FIG. 3 and serve as a hinge for moving the cover 3, shafts or pins (not shown) can be used which are guided through corresponding openings or brackets (not shown).

The cover 18 comprises a so-called vibration protection 24 or an extended are at its end opposite the projection 20, which is formed by an extension formed at the cover 18. As can best be seen from FIG. 3, the vibration protection 24 has a contoured area 26 at its outer surface. The contoured area 26 comprises longitudinal grooves formed in the vibration protection 24, with provisions being made to also use transverse grooves or other structures which may also be arranged at both outer surfaces of the vibration protection 24 as long as the function of the vibration protection 24, which will be described in the following, is provided.

Figure 2:
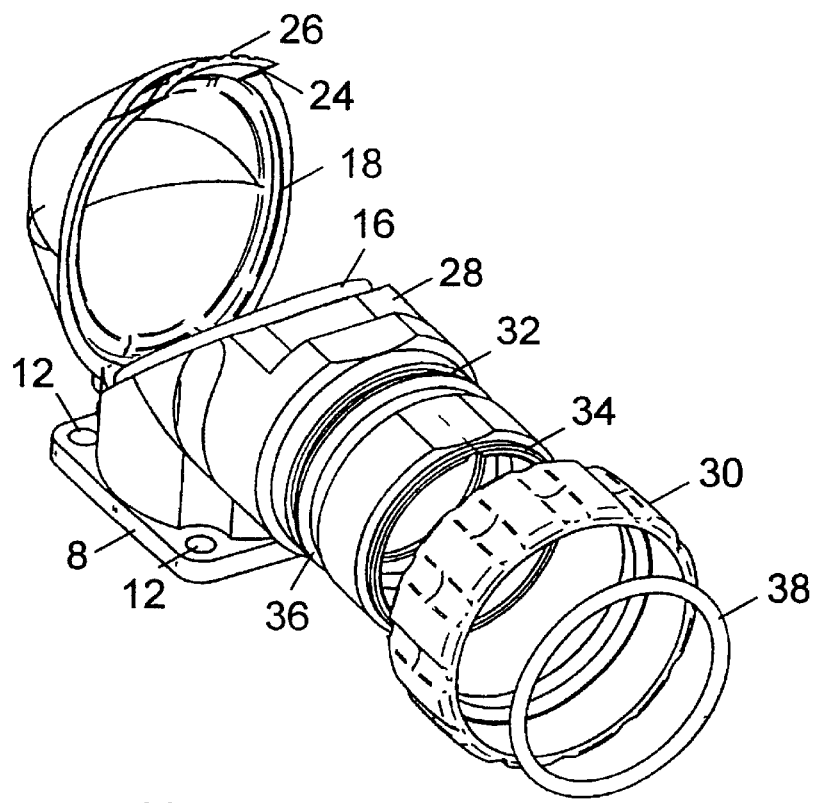
FIGS. 2 and 3 show perspective views of the mounting housing of FIG. 1.
Figure 3:
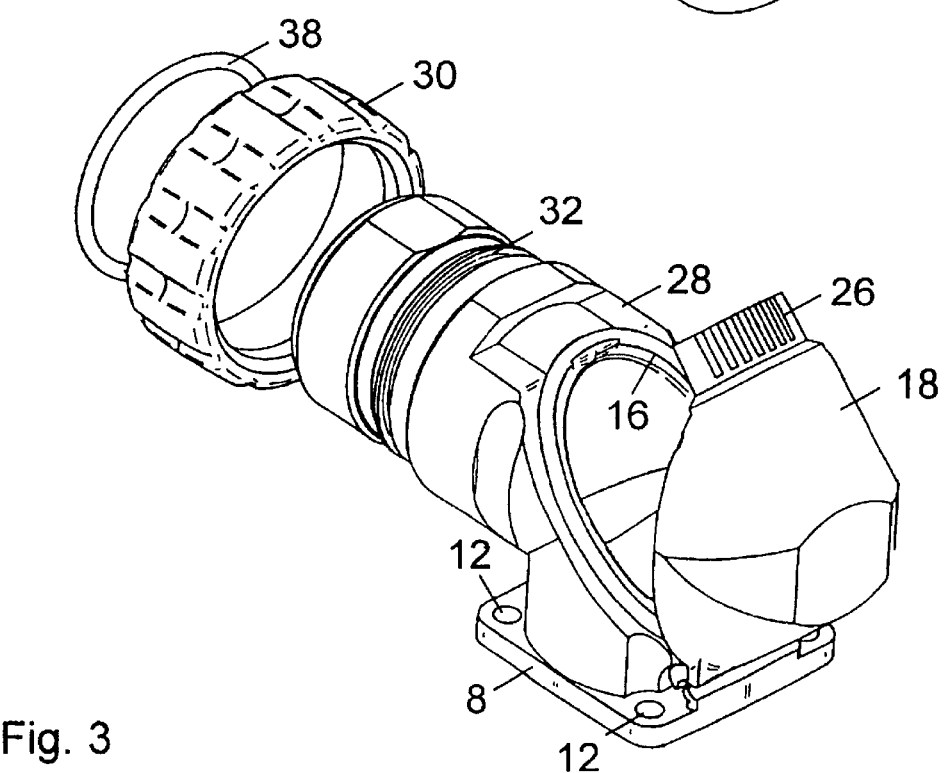
Figure 7A:
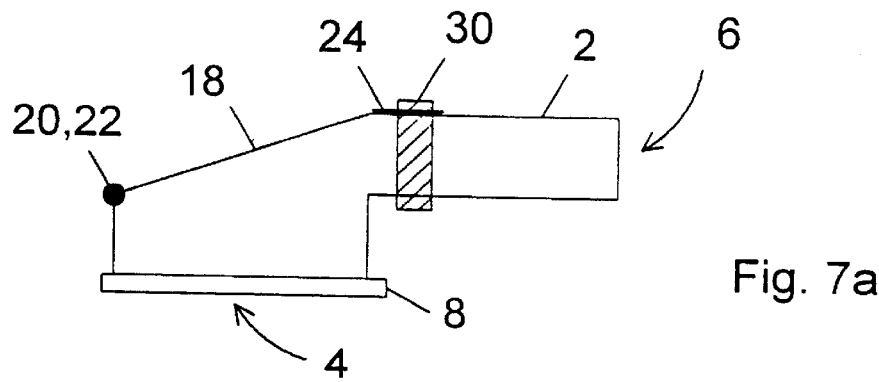
FIGS. 7a–7d show further embodiments of inventive mounting housings.
Figure 7B:
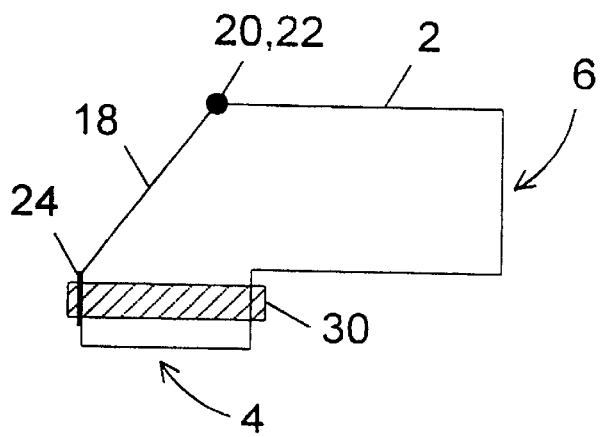
Figure 7C:
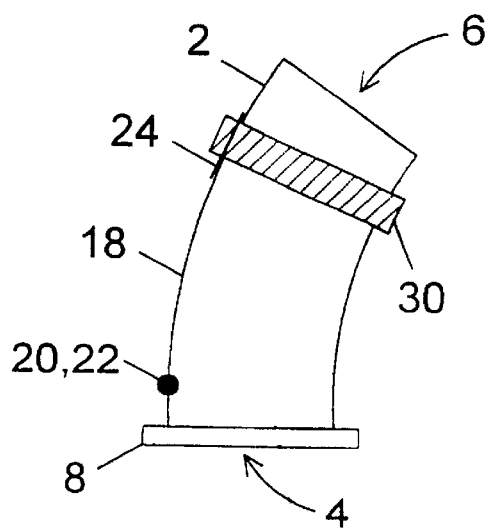
Figure 7D:
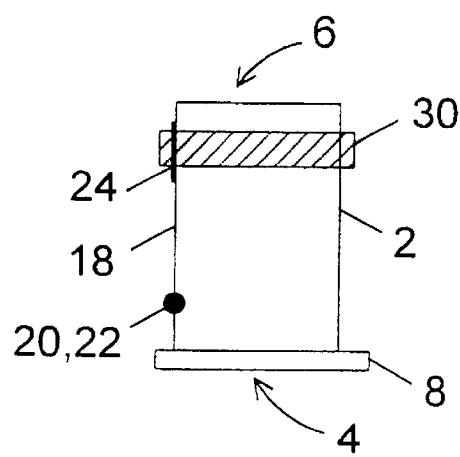

In an area of its outer circumferential surface which is shown as an upper surface in FIGS. 1, 2, and 3, the housing body 2 comprises a pressure surface 28. The pressure surface 28 serves as a counter bearing for the vibration protection 24 when the cover 18 for closing the access opening 14 is moved in such a manner that it contacts the housing body 2. In the closed condition of the cover 18 the O-ring 16 seals the access opening 14. For securing the cover 18 in its closed condition a retaining nut 30 is used which is screwed on the housing body 2 by means of a thread 32.

The retaining nut 30 and/or the thread 32 are designed in such a manner that the vibration protection 24 is clamped between the retaining nut 30 and the pressure surface 28 or a contact area 28 when the retaining nut 30 is screwed on the housing body 2. This closed or assembled condition, respectively, of the mounting housing 1 is illustrated in FIGS. 4, 5, and 6. A vibration protection for the mounting housing 1, or to be more precise, for the cover 18, is provided by the vibration protection 24 being clamped between the retaining nut 30 and the pressure surface 28, and in particular by its contoured area 26. In the simplest case the retaining nut 30 is screwed on the housing body 2 until the contoured area 26 contacts the thread (not shown) arranged at the inner circumferential surface of the retaining nut 30. It is also possible to use retaining nuts which comprise an area on the inner circumferential surface without thread, which in the screwed on condition urges the vibration protection 24 against the pressure surface 28. This, however, requires special retaining nuts but permits to design the thread 32 shorter in the longitudinal direction of the corresponding area of the housing body 2 and/or to arrange it at a shorter distance from the opening 6.

Due to the use of the retaining nut 30 for securing the cover 18 in its closed condition no additional tools are required, In addition, this increases the tolerances to be maintained by the rotatable connection of the cover 18 with the housing body 2 because the screwed on retaining nut 30 urges the cover 18 in such a manner against the O-ring 16 that the access opening 14 is tightly sealed. The installation of the cover 18 at the housing body 2 can also be performed without additional tools because the cover 18 under using the projections 20 and 22 is simply hooked in the housing body 2. With the above mentioned possible use of a rotation axis (e.g. in the form of a pin or split-pin) the assembly and disassembly of the cover 18 can also be performed without additional auxiliary means because, as described above, no special tolerances must be maintained for the rotatable connection of the cover 18 with the housing body 2.

For arranging further devices, e.g. a plug-and-socket connection for cables, at the mounting housing 1, the housing body 2 comprises a thread 34 at its end adjacent to the opening 6. In order to provide a sealed connection between a device screwed on the housing body 2 and the housing body 2, a groove 36 is formed in the housing body 2, which serves as a seat for an O-ring 38. For securing a device (e.g. plug-and-socket connection) at the mounting housing 1, for example a coupling ring (not shown) can be used which is screwed on the thread 34 and sealingly contacts the O-ring 38. In addition to the sealing function of the O-ring 38 thereby provided, the O-ring 38 when correspondingly dimensioned prevents the loss of the retaining nut 30. The O-ring 38 also serves as a vibration protection for a device arranged (screwed on) at the housing body 2.

Another advantage of the mounting housing 1 is that it can be arranged on a mounting surface (not shown) for the mounting flange 8 also after pre-assembly, for example with a plug-and-socket connection which is screwed on by using the thread 34. As can be seen from FIG. 5, the mounting flange 8 is formed in such a manner that the holes 12 are accessible in the assembled condition of the mounting housing 1 in order to insert corresponding fastening elements (e.g. screws, rivets).

In lieu of the holes 12 locking or snap-action elements (not shown) formed at the mounting flange 8 can be used which in active connection with a corresponding structure arranged at the mounting surface for the mounting flange 8 provide a locking or snap-action connection for the mounting housing 1. For releasing such a snap-action connection in the assembled condition of the mounting housing 1, suitable elements/structures for the snap-action elements (not shown) of the mounting flange 8 are to be arranged like the holes 12 in areas which can be accessed in the condition of the mounting body 1 shown in FIG. 5.

In a similar manner, other suitable connection structures (e.g. locking or snap-action elements, elements for bayonet joints) can be used instead of the thread 34 for arranging further devices (e.g. connectors).

With reference to FIGS. 7a–7d further embodiments of the mounting housing will be explained. Contrary to the mounting housing 1 illustrated in FIGS. 1–6, the mounting housing 30 shown in FIG. 7a comprises a cable feed-through (not identified) which has a greater cross-section in the area extending towards the opening 4 than in the area extending towards the opening 6. Thereby an access opening 14 can be provided which is larger than the access opening 14 shown in FIGS. 1–6. Such an enlarged access opening 14 may be required depending on components (not shown) to be arranged in the mounting housing 1, or at least facilitate their arrangement.

In addition, the rotatable connection/the hinge for the cover 18 can also be arranged in an area of the housing body 2 in which in the embodiment illustrated in FIGS. 1–6 the pressure surface 28 is arranged. Accordingly, in the embodiment shown in FIG. 7b the pressure surface 28 is arranged in an area of the outer circumferential surface of the housing body 2 adjacent to the opening 4. As described above, the retaining nut 30 in conjunction with a thread corresponding to the thread 32 serves to secure the cover 18 at the housing body 2. In order to arrange the retaining nut 30 at the housing body 2 the mounting flange 8 must be formed later in the manufacture of the mounting housing 1. In this case, in particular, the obvious solution would be to use suitable locking or snap-action elements instead of the mounting flange 8, as described above.

Moreover, it is provided to use a curved housing body (FIG. 7c) or an oblong housing body (FIG. 7d) instead of an angled housing body. With a curved housing body, it is of particular importance that the corresponding area for the arrangement of the retaining nut 30 is suitably designed. The use of an oblong housing body for the mounting housing may be required if the inner space of same is to be accessed without having to disassemble the mounting housing from e.g. a switchgear cabinet or to remove devices (e.g. connectors) attached at the mounting housing.

What is claimed is:

1. A mounting housing (1) for electrical conductors optical conductors, fluid lines, mechanical components such as articulated shafts of Bowden cables comprising:

a housing body (2), a feed-through extending through the housing body (2), an access opening (14) to the feed-through of the housing body (2), a cover (18) movably connected with the housing body (2) for closing and clearing the access opening (14), the cover including an extended area (24) and a retaining means (30) for securing the cover (18) in its closed condition, the retaining means (30) cooperating with the extended area (24) to secure cover (18) in said closed condition.

2. The mounting housing according to claim 1, characterised in that the extended area (24) in the closed condition of the cover (18) is secured between the retaining means (30) and the housing body (2).

3. The mounting housing according to claim 2, characterised in that the housing body (2) comprises a contact area (28) which is formed for a positive contact with the extended area (24) of the cover (18), and the extended area (24) of the cover (18) in the closed condition of the cover (18) is secured between the retaining means (30) and the contact area (28).

4. The mounting housing according to claim 2, characterised in that the extended area (24) includes a contoured area (26) which comprises recesses formed in the cover (18).

5. The mounting housing according to claim 4, characterised in that the contoured area (26).

6. The mounting housing according to claim 1, characterised in that an elastic sealing element (16) is arranged in the area of the access opening (14), which in the closed and secured condition of the cover (18) is elastically deformed due to an active connection with same.

7. The mounting housing according to claim 1, characterised in that the retaining means (30) is a retaining nut, and the housing body,(2) comprises a thread (32) for installing the retaining means (30).

8. The mounting housing according to claim 7, characterised in that the thread (32) is spaced in the longitudinal direction of the feed-through from the contact area (28) or encompasses the contact area (28).

9. The mounting housing according to claim 7, characterised in that the housing body (2) has a round cross-section at least in the area of the thread (32).

10. The mounting housing according to claim 1, characterised in that the retaining means (30) is a retaining sleeve which can be slid on the housing body (2).

11. The mounting housing according to claim 10, characterised in that the housing body (2) comprises locking elements or clamping elements for releasably securing the retaining sleeve.

12. The mounting housing according to claim 10, characterised in that the retaining sleeve is elastically deformable for releasing its secured position at the housing body (2).

13. The mounting housing according to claim 1, characterised in that the housing body (2) comprises a mounting flange (8) at a first end with holes (12) formed therein which can be accessed in the closed condition of the cover (18).

14. The mounting housing according to claim 1, characterised in that the housing body (2) comprises locking elements at a first end which can be actuated in the closed condition of the cover (18).

15. The mounting housing according to claim 1, characterised in that the cover (18) is movably hooked in the housing body (2) by using structures (20,22) formed at the cover (18) and the housing body (2), or the cover (18) is movably connected with the housing body (2) by means of shafts or pins being in active connection with the cover 18 and the housing body(2).

16. The mounting housing according to claim 1, characterised in that the housing body (2) comprises fastening elements (34) at a second end opposite the first end for devices to be arranged at the housing body (2).

17. The mounting housing according to claim 1, characterised in that the housing body (2) is an angled, curved, or oblong body.

18. The mounting housing according to claim 1, characterised in that the feed-through through the housing body (2) has an essentially round or rectangular cross-section.

* * * * *